Reed & Shaeffer,
Line Fastener.
No. 113,563. Patented Apr. 11, 1871
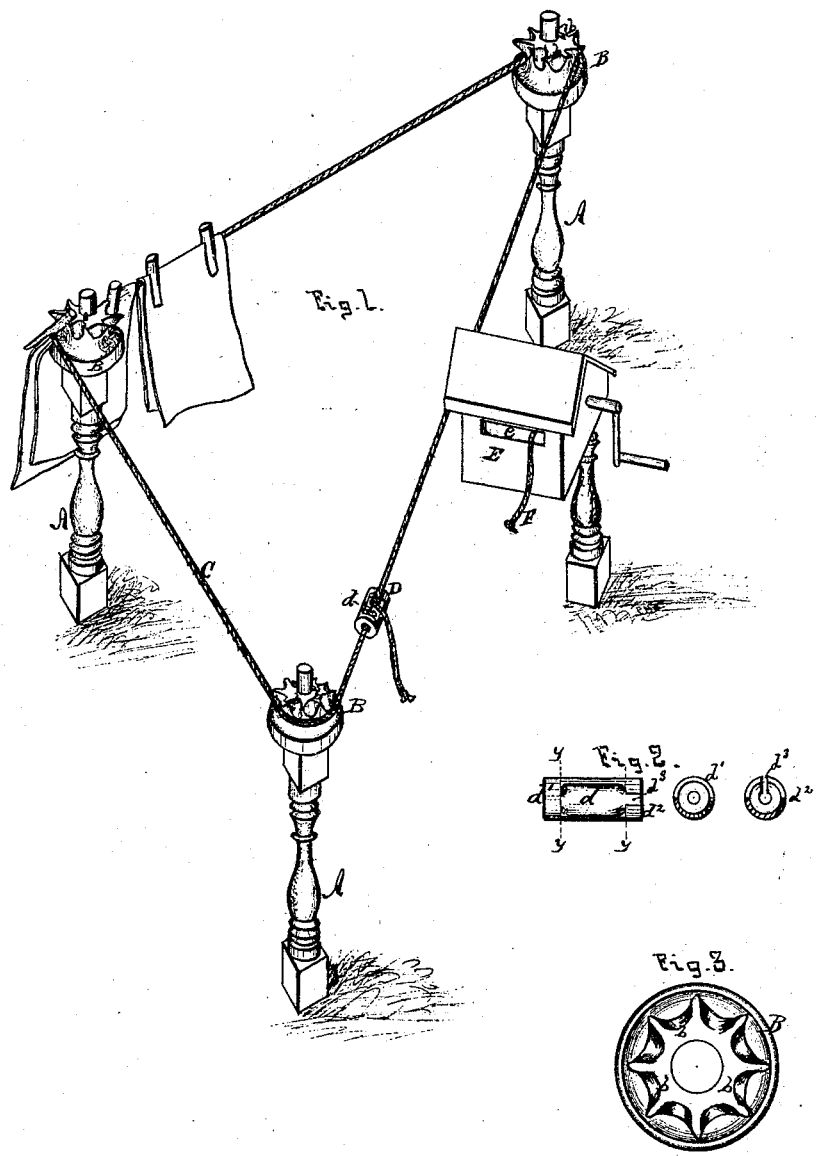

United States Patent Office.

DAVID REED AND AMOS SHAEFFER, OF MEDWAY, OHIO.

Letters Patent No. 113,563, dated April 11, 1871.

IMPROVEMENT IN CLOTHES-LINE CONDUCTORS.

The Schedule referred to in these Letters Patent and making part of the same.

*To all whom it may concern:*

Be it known that we, DAVID REED and AMOS SHAEFFER, of Medway, in the county of Clarke and State of Ohio, have invented a new and useful Improvement in Clothes-Line Conductors; and we do hereby declare that the following is a full and exact description of the same, reference being had to the accompanying drawing and to the letters of reference marked thereon.

This invention has for its object the production of a simple and effective method of conducting and arranging a clothes-line and devices for operating the same, whereby a person standing in an open window or doorway may place the clothes upon and remove them from the line without materially changing position or being exposed to the weather, as is necessary when the line is stationary. It consists also in providing a coupling, which shall permit of the line being connected so as to be continuous, and disconnected, with ease and dispatch, and of being attached to a sheltered reel located at the most convenient operating point.

To enable others skilled in the art to make and use our invention we will now proceed to describe fully the method of constructing and operating the same.

In the drawing—

A A A represent posts, which may be of any desired number and arranged in any convenient position, one of them, however, being preferably located near some convenient sheltered point, such as the porch, door, or window of a wash-house, so as to bring a portion of the line within easy reach from such point.

Upon the top of each post, revolving around a vertical center, is a pulley, B, formed of any suitable material, and similar to an ordinary pulley, except that the upper flange is provided on its edge with semicircular notches $b\ b$, beveled inwardly toward the center, so that in the operation of moving the line when it is filled or partially filled with clothes the top of the pins which attach them may work into these notches, and thus lessen the liability of the line to run out of the grooves and also prevent it from slipping.

C represents a line connected by a cylindrical coupling, D, preferably formed of brass or galvanized iron, having an opening, $d$, on one side sufficiently long and deep to admit of the reception of two knots, one at each end of the rope, as clearly shown.

The shoulder-head $d^1$ has an opening through its center of sufficient size to allow of the free insertion of the end of the rope before a knot is tied in it.

The head $d^2$ differs from this in that it has a slot, $d^3$, extending from the side corresponding to opening $d$ to an opening in its center corresponding in size and position to that in the head $d^1$. This slot is designed for the insertion of the opposite end of the rope after a knot has been made, the knot, of course, bearing against the inner face of the shoulder.

E represents the reel-box, constructed in any proper manner, having a horizontal opening, $e$, in one side, through which passes a short piece of rope, F, one end of which is attached to a reel inside the box, and the other, having a knot, is slipped into the open shoulder-head $d^2$ after the line has been uncoupled and it is desired to reel it for future use.

The reel and box may be located on a post, as shown in the drawing, or the reel may be secured, independent of the box, inside of any convenient building.

The operation is as follows:

The several posts having pulleys, as described, being in proper position, the line is attached as follows:

One end is run through the opening in shoulder-head $d^1$ and a knot formed. This is to be permanent. The knotted end of the short reel-cord F is now slipped into the open head $d^2$, and the line, being placed upon the different pulleys, is at length brought around to the coupling, where it is drawn tight, cut to a proper length, and a knot formed at or near the end, which, after cord F is released from the coupling, is inserted in its place, thus completing the circuit and making a continuous line, ready for the clothes.

When it is desired to gather in the line, all that is necessary, after the clothes have been removed, is to disconnect it from the open end of the coupling, attach the short cord F in its place, and wind it on the reel.

The advantages of the above-described device are evident. After the line has been once wound upon the reel, it being already cut to a proper length, it is comparatively little work to run it around the pulleys and couple it. It can be readily tightened by simply tying an additional knot in the free end, and it can be so quickly reeled that there is no necessity of ever leaving it exposed to the weather after the clothes are off. Every foot of line may be made available, even that which is around the pulleys, which, from their peculiar construction, allow the top of the pins to lean in toward the center, thus keeping the line nearer to the surface of the grooves, and of course making it less liable to run off than would be the case if there was a continuous flange corresponding to the base of the pulley, while the bearing of the pins against the projections renders it easier to revolve the pulleys.

The inclination thus given to the pins, especially if they be long ones, has a tendency also to throw the clothes away from the post, the base of the pulley being much broader than the top.

We are aware that endless lines have been used, working around vertical pulleys, and that we do not broadly claim; but

Having thus fully described our invention,
What we claim as new, and desire to secure by Letters Patent, is

1. The pulleys B, of the above-described construction, arranged upon posts or other proper support, in combination with a reel having a short line attached, in the manner and for the purpose herein described.

2. The pulley B, having its upper flange provided with semicircular notches $b\ b$, as described, when arranged upon posts and used in connection with a clothes-line, as described.

3. The coupling D, with opening $d$, head $d^1$, head $d^2$, with slot $d^3$, in combination with the line C, as set forth.

This specification signed and witnessed this 21st day of January, 1871.

DAVID REED.
AMOS SHAEFFER.

Witnesses:
  JACOB E. JOHNSON,
  WILLIAM WISE.